United States Patent
Lewis et al.

(10) Patent No.: US 10,308,431 B2
(45) Date of Patent: Jun. 4, 2019

(54) FLEXIBLE CONVEYOR BELT WRAPPER

(71) Applicants: William James Lewis, Woodstock, IL (US); Marc W. F. Lewis, McHenry, IL (US); Malcolm M. Swift, Lake in the Hills, IL (US); Lambert Allen Terpstra, Crystal Lake, IL (US); William Christopher Lewis, St. Charles, IL (US)

(72) Inventors: William James Lewis, Woodstock, IL (US); Marc W. F. Lewis, McHenry, IL (US); Malcolm M. Swift, Lake in the Hills, IL (US); Lambert Allen Terpstra, Crystal Lake, IL (US); William Christopher Lewis, St. Charles, IL (US)

(73) Assignee: ADVANCED FLEXIBLE COMPOSITES, INC., Lake in the Hills, IL (US)

( * ) Notice: Subject to any disclaimer, the term of this patent is extended or adjusted under 35 U.S.C. 154(b) by 842 days.

(21) Appl. No.: 13/774,283

(22) Filed: Feb. 22, 2013

(65) Prior Publication Data
US 2013/0240333 A1    Sep. 19, 2013

Related U.S. Application Data

(60) Provisional application No. 61/603,020, filed on Feb. 24, 2012.

(51) Int. Cl.
*B32B 1/08* (2006.01)
*B65G 15/30* (2006.01)
(Continued)

(52) U.S. Cl.
CPC ............ *B65G 15/30* (2013.01); *B65G 15/32* (2013.01); *B65G 23/14* (2013.01)

(58) Field of Classification Search
CPC .................................. B32B 1/08; B32B 27/08
See application file for complete search history.

(56) References Cited

U.S. PATENT DOCUMENTS

| 1,493,313 A | 5/1924 | Young et al. |
| 2,459,770 A * | 1/1949 | Escher ................... B65G 33/00 |
| | | 198/860.5 |

(Continued)

FOREIGN PATENT DOCUMENTS

| DE | 179 623 C | 12/1906 |
| DE | 102006015100 A1 * | 10/2007 |

(Continued)

OTHER PUBLICATIONS

European Patent Office, Communication, EPO Form 2906, dated Dec. 9, 2016 (6 pages).

(Continued)

*Primary Examiner* — Marc A Patterson
(74) *Attorney, Agent, or Firm* — Pauley Erickson & Kottis (57) ABSTRACT

A flexible composite conveyor belt, such as for use as a belt wrapper in overlying combination with a metal belt in cooking or heating operations. The belt includes a protrusion attached to a flexible substrate. The protrusion includes an engagement surface adapted to secure the protrusion to a portion of the underlying metal belt to drive the belt at a same speed as the conveyor belt. Protrusions on opposing ends of the belt negate the need for conventional lacing in securing the ends of the belt together.

26 Claims, 8 Drawing Sheets

(51) Int. Cl.
  B65G 15/32 (2006.01)
  B65G 23/14 (2006.01)
  B32B 1/02 (2006.01)

(56) References Cited

U.S. PATENT DOCUMENTS

| | | | |
|---|---|---|---|
| 2,514,429 A | | 7/1950 | Waugh |
| 2,718,004 A | * | 9/1955 | Steinmetz ................ 227/17 |
| 3,280,847 A | | 10/1966 | Chisholm et al. |
| 3,329,256 A | | 7/1967 | Elgaway |
| 3,708,382 A | * | 1/1973 | Erb ............... A44B 18/0038 24/451 |
| 3,915,025 A | * | 10/1975 | Poerink ................ 198/848 |
| 4,282,971 A | | 8/1981 | Becker |
| 4,286,870 A | | 9/1981 | Silverberg |
| 4,541,154 A | * | 9/1985 | Ito ................ A44B 18/0015 24/306 |
| 4,922,304 A | | 5/1990 | Gilbert et al. |
| 5,231,738 A | * | 8/1993 | Higashinaka ....... A44B 18/003 24/446 |
| 5,232,771 A | * | 8/1993 | Fadell et al. .......... 428/300.1 |
| 5,339,499 A | * | 8/1994 | Kennedy ........ A44B 18/0061 24/442 |
| 5,586,371 A | * | 12/1996 | Thomas ............ A44B 18/0049 24/306 |
| 5,588,354 A | | 12/1996 | Stuck et al. |
| 5,591,796 A | * | 1/1997 | Wisniewski et al. ........ 524/484 |
| 5,960,704 A | * | 10/1999 | March et al. ................ 99/349 |
| 6,035,765 A | | 3/2000 | Finck |
| 6,329,987 B1 | * | 12/2001 | Gottfried et al. ............ 345/419 |
| 6,352,150 B1 | | 3/2002 | Lewis |
| 6,648,127 B2 | * | 11/2003 | Molinaro et al. .......... 198/502.1 |
| 6,919,122 B2 | | 7/2005 | Keese et al. |
| 7,850,562 B2 | | 12/2010 | DeGroot |
| 8,025,144 B2 | | 9/2011 | Lewis et al. |
| 9,174,142 B2 | * | 11/2015 | Lee ................... A44B 18/0053 |
| 2002/0059705 A1 | * | 5/2002 | Martin ................ 24/449 |
| 2003/0224137 A1 | * | 12/2003 | Chung ............. A44B 18/0003 428/85 |
| 2004/0109986 A1 | | 6/2004 | Keese et al. |
| 2004/0163935 A1 | | 8/2004 | Fatato et al. |
| 2006/0156598 A1 | * | 7/2006 | Johnston et al. ............. 40/524 |
| 2007/0240289 A1 | * | 10/2007 | Murasaki .......... A44B 18/0061 24/442 |

FOREIGN PATENT DOCUMENTS

| | | |
|---|---|---|
| GB | 310394 | 4/1929 |
| GB | 842859 A | 7/1960 |
| JP | S58-42509 A | 3/1983 |
| JP | 2006-703 A | 1/2006 |
| WO | WO 2005/040016 A1 | 5/2005 |

OTHER PUBLICATIONS

European Patent Office, Communication, EPO Form 15075, dated Dec. 1, 2015 (1 page).
European Patent Office, Supplementary European Search Report, EPO Form 1503 03.82, dated Nov. 25, 2015 (2 pages).
European Patent Office, Annex to the European Search Report on European Patent Application No. EP 13 75 2253, EPO Form P0459, dated Nov. 25, 2015 (1 page).
European Patent Office, Information on Search Strategy, EPO Form P0459, Dec. 1, 2015 (1 page).
European Patent Office, European Search Opinion, EPO Form 1703 01.91TRI, dated Dec. 1, 2015 (5 pages).

* cited by examiner

FLEXIBLE CONVEYOR BELT WRAPPER

CROSS REFERENCE TO RELATED APPLICATION

This application claims the benefit of U.S. Provisional Patent Application Ser. No. 61/603,020, filed on 24 Feb. 2012. The Provisional Application is hereby incorporated by reference herein in its entirety and is made a part hereof, including but not limited to those portions which specifically appear hereinafter.

FIELD OF THE INVENTION

This invention relates generally to a conveyor belt and, more particularly, to a flexible composite conveyor belt, such as for use as a belt wrapper in overlying combination with a metal belt in cooking or heating operations.

BACKGROUND OF THE INVENTION

Conveyor belts are known for a variety of uses, such as in food cooking applications where the belt is used to convey objects continuously through a cooking or heating zone of high temperatures. One particularly useful application of a flexible belt is as a belt wrapper in a contact toaster device such as the one shown in U.S. Pat. No. 5,960,704, herein incorporated by reference, that incorporate a metal-linked conveyer belt to convey food objects, such as buns, along and against a heated platen to toast the buns. The buns may be undesirably marked by the heated metal belt or overly compressed against the platen.

Silicone rubber-coated fiberglass fabrics and polytetrafluoroethylene ("PTFE") coated and/or laminated fiberglass fabrics, are commonly used in conveyor belts for diverse applications. Smooth polymer coated belts are capable of eliminating markings, but typically do not exert sufficient lateral force to move food objects consistently and reliably through the toasting device. Silicone belts have been used in overlapping combination with metal-linked conveyor belts, such as using molded flights on both sides of the silicone belt to interact with the food on one side and the metal conveyor belt on the opposing side. However, over time, grease buildup and/or molded flight wear can increase slipping of the silicone belt with respect to the metal belt. In addition, the flexibility of the belts can provide tracking issues, resulting in an off-center and damaged belt. There is a continuing need for improved belting for cooking and heating operations.

SUMMARY OF THE INVENTION

The invention provides a conveyor belt or conveyor belt wrapper that covers or overlies, for example, a metal link belt, and provides grip to objects, such as food items, to transport the food items through vertical or horizontal cooking, toasting, or heating machines. The belt wrapper of this invention desirably reduces or eliminates belt slipping and lateral tracking issues that can occur with existing belt wrappers. The belt wrapper of this invention has two faces, with a first face that contacts the food item and a second face that contacts the metal drive belt and is capable of being driven by the metal drive belt. The second face does not need to be coated or tacky, but the face is desirably cleanable. The first face can be smooth with a tacky coating, textured, or contain molded flights or ribs.

The belt wrapper of this invention includes a hook, clip, peg, lug, or other protrusion that provides positive drive for, and prevents slipping of, the wrapper on the drive belt. Also, the protrusion, which secures or fixes the belt wrapper to the drive belt, reduces or eliminates poor tracking of the belt wrapper, thus enabling the belt wrapper to remain centered on the metal drive belt. The protrusion can be molded, pressed, formed, or bent in order for it to assume the shape necessary to correspond with the drive belt. The protrusion can be attached to the belt wrapper by molding, gluing, or mechanical fastening such as rivets or screws. The protrusion can be manufactured from metal, engineered resin, or any other high-temperature polymer capable of withstanding the operating temperatures of about 450 to 600° F., and more preferably about 500 to 600° F.

A general object of the invention can be attained, at least in part, through a flexible belt wrapper for a continuous conveyor belt that includes a flexible substrate having a first face and a second face opposite the first face, a coating on the first face of the flexible substrate, and a protrusion attached to the flexible substrate. The protrusion includes an engagement surface adapted to secure the protrusion to a portion of the conveyor belt to drive the belt wrapper at a same speed as the conveyor belt. The flexible substrate can be formed of fiberglass, nylon, polyester polyethylene, aramid, polyimide, polyphenylene sulfide, polyethersulfone, polyetheretherketone (PEET), or combinations thereof. The coating can be or include a fluoropolymer such as a fluoroplastic (e.g., PTFE) or fluoroelastomer, silicone rubber, urethane rubber, or combinations thereof. Optional flights or ribs can be raised above the coating on the first face, and can either extend across the face or be discontinuous across the first face.

In one embodiment of this invention, the engagement surface of the protrusion is disposed facing a direction that is parallel to the second face. The engagement surface can additionally or alternatively include a concave or curved portion, such as where the conveyor belt comprises a chain, wire, or crossbar belt to which the curved portion connects. The engagement surface can include a curvature at least as large as a curvature of a wire or crossbar of the conveyor belt to facilitate attachment.

The protrusion can be or include a hook, clip, peg, lug, snap, or hook and loop fastener, and can be formed of metal or a high-temperature resistant polymer. The protrusion can be molded, adhered, or mechanically fastened to the flexible substrate. In one embodiment, the protrusion comprises a base fixed to the flexible substrate and a hook extending from the base. The protrusion can also include two engagement surfaces, such as two opposing hooks, to form a clip.

In one embodiment of this invention, the flexible belt has a leading end and a trailing end. At least one protrusion is attached to the flexible substrate at a leading end to secure the leading end to a conveyor belt. A second protrusion is attached to the flexible substrate at the trailing end to secure the trailing end to the conveyor belt. In such an embodiment, the flexible belt wrapper does not require additional elements, such as the conventional metal lacings connected together by a pin, to connect the two ends around the conveyor belt. By not having to thread a long pin in a small lacing in the tight space near the hot toaster platen, the invention improves safety issues for the user of the toaster.

The invention further includes a flexible belt wrapper for a continuous conveyor belt, including a flexible substrate having a first face and a second face opposite the first face, a coating on the first face of the flexible substrate, and a protrusion extending from the flexible substrate. The protrusion includes a hook adapted to engage with a portion of the conveyor belt. The protrusion can be attached to the flexible substrate by at least one mechanical fastener. The protrusion can be embodied as a clip, such as including two oppositely facing hooks. A first hook can extend from a first edge of a base and a second hook can extend from a second side edge of the base that is opposite the first side edge. The flexible belt wrapper is used in combination with a continuous wire belt of a cooking device, wherein the belt wrapper overlays the wire belt and the one or more hook is hooked onto a wire of the wire belt.

The invention still further includes a flexible belt wrapper for a continuous conveyor belt, including a flexible substrate having a first face and a second face opposite the first face, a coating on the first face of the flexible substrate, ribs extending from the coating on the first face, each of a first plurality of the ribs laterally aligned with and separated by a spacing from one of a second plurality of the ribs, and a protrusion attached to the flexible substrate. The protrusion includes an engagement surface adapted to secure the protrusion to a portion of the conveyor belt to drive the belt wrapper at a same speed as the conveyor belt. The flexible belt wrapper has a leading end and a trailing end, and a first protrusion can be disposed at the leading end to secure the leading end to the conveyor belt, and a second protrusion can be disposed and attached to the flexible substrate at the trailing end to secure the trailing end to the conveyor belt. Each of the first protrusion and the second protrusion can be formed as a clip including two opposing engagement surfaces.

Other features, objects, and advantages will be apparent to those skilled in the art from the following detailed description taken in conjunction with the appended claims and drawings.

DETAILED DESCRIPTION OF THE INVENTION

The present invention provides a conveyor belt, and more particularly a flexible belt wrapper for a continuous conveyor belt. The belt wrapper is made of a flexible material, or a flexible coated and/or laminate material, and can be used as a conveyor belt alone or in combination with another conveyor belt. The flexible belt wrapper includes a connection element for connecting the flexible belt wrapper to an underlying conveyor belt, thereby providing a secure connection between the connected belts to allow the belts to travel together at the same speed without belt slippage. The belts of this invention can be used, for example, in the food industry in conjunction with high temperature food processing, ranging from about 300° F. to 600° F., and more preferable 500° F. to 600° F., at least for short durations.

Figure 1:
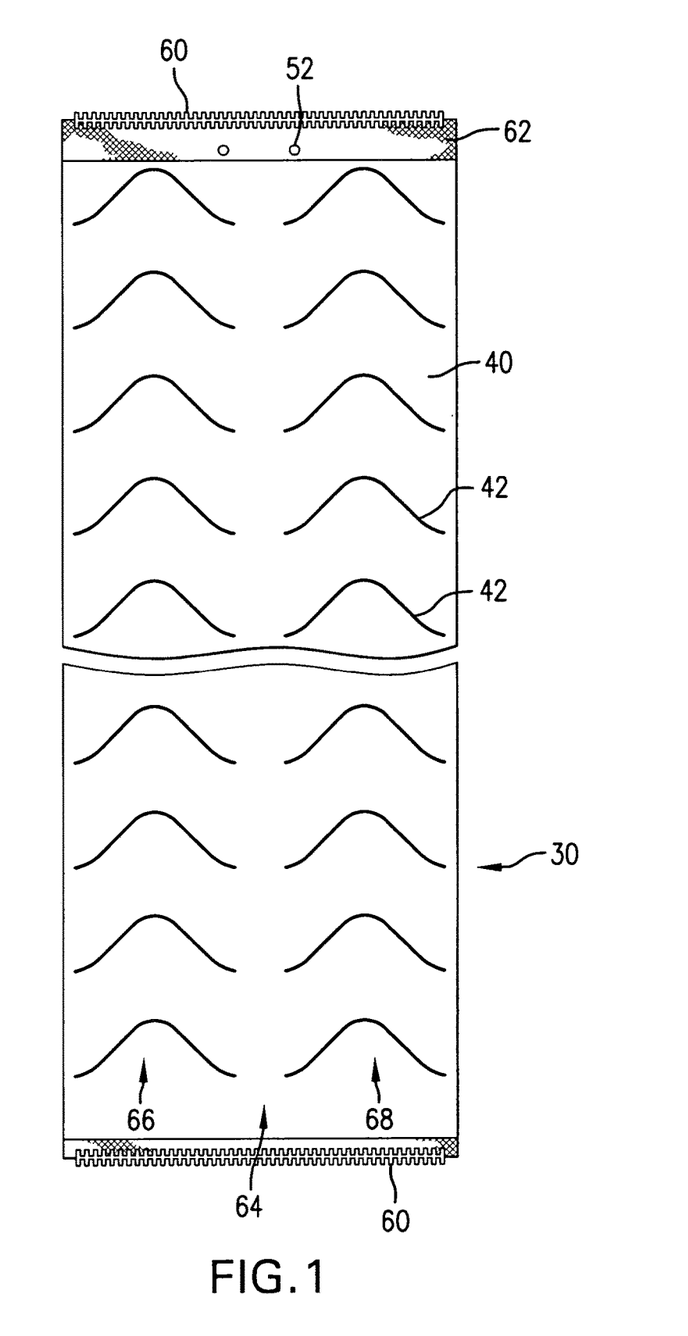
FIG. 1 is a top planar view of a belt wrapper according to one embodiment of this invention.
Figure 2:
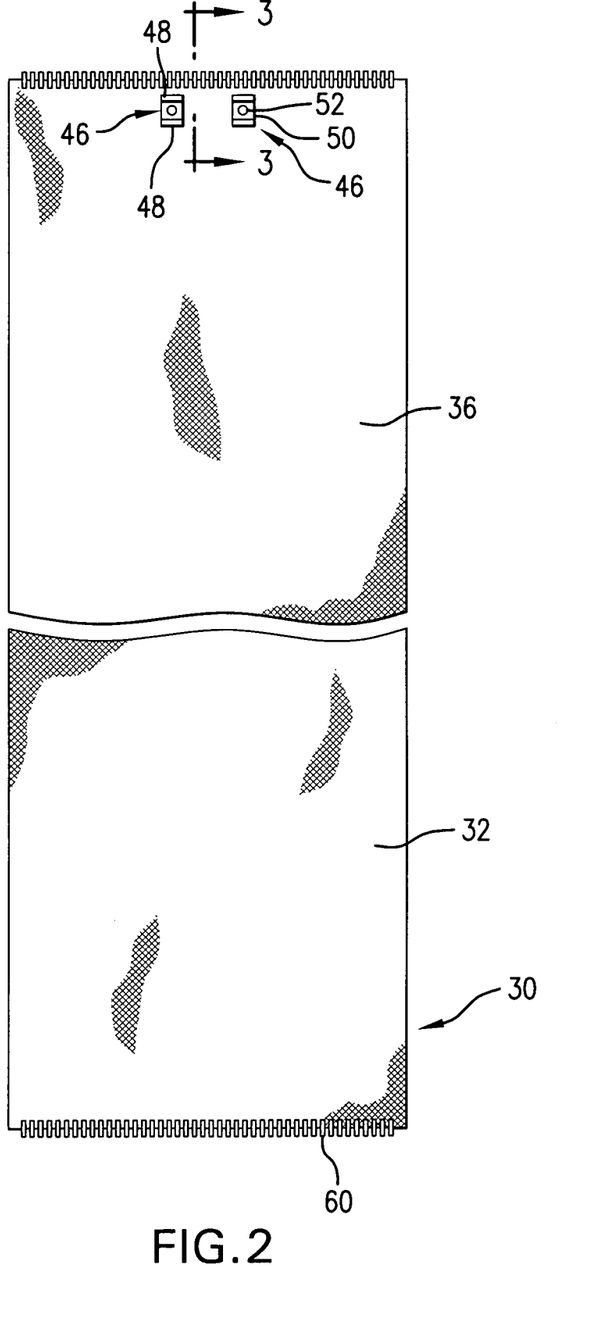
FIG. 2 is a bottom view of the belt wrapper of FIG. 1.
Figure 3:
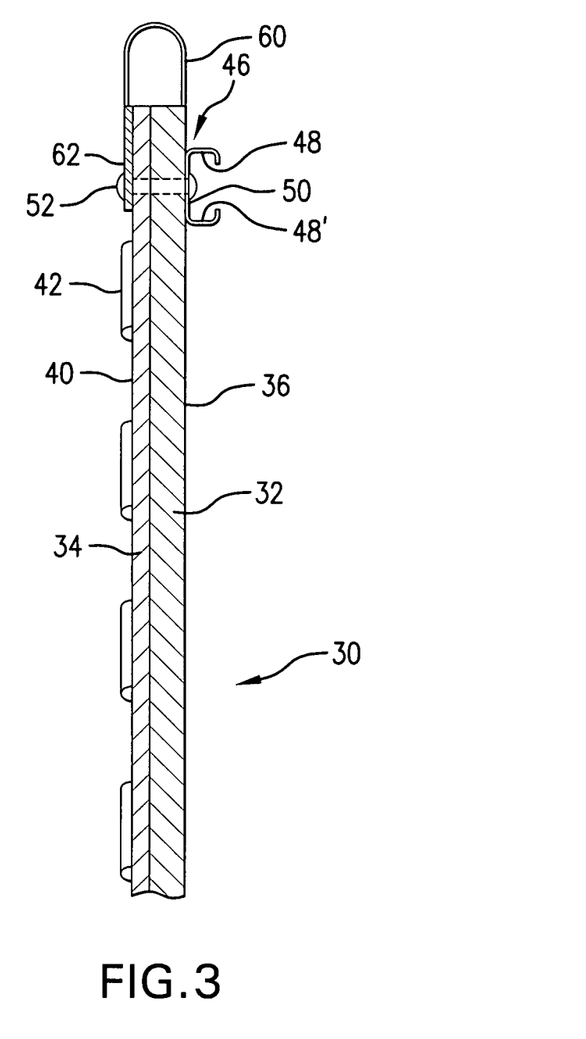
FIG. 3 is a partial and sectional view taken along lines 3-3 in FIG. 2.

FIGS. 1-3 illustrate a flexible belt wrapper 30 according to one embodiment of this invention, which includes a flexible substrate 32 having a first face 34 and a second face 36 that is opposite the first face. The flexible substrate 32 can be formed from any suitable flexible conveyor belt material, such as fiberglass, nylon, polyester polyethylene, aramid, polyimide, polyphenylene sulfide, polyethersulfone, polyetheretherketone (PEET), or combinations thereof. The flexible substrate can be woven, nonwoven, or a film layer.

The flexible belt wrapper 30 includes a coating 40 on at least the first face 34. The coating can be formed of one or more layers of suitable polymers. Exemplary coating polymers include fluoropolymers, such as a fluoroplastic or fluoroelastomer, silicone rubbers, urethane rubbers, or combinations thereof. In one embodiment of this invention, the coating is tacky and/or can optionally include a plurality of flights or ribs 42 raised above the coated face, in a regular, repeating, natural, random, or cyclical pattern, such as described in U.S. Pat. No. 6,919,122, herein incorporated by reference. The second face 36 can include a coating and/or flights as well, and can be identical to or different from the first face 34. In one embodiment, the flexible substrate 32 is coated in the entirety, such as by dip-coating, and the coating 40 is applied as a second or further coating on the coated flexible substrate. In one embodiment, the coating on the second face 36 is a sliding or non-tacky coating, having a low coefficient of friction to provide a sliding surface. It has been unexpectedly discovered that the non-tacky second face 36 in combination with the protrusions of this invention, desirably reduces or eliminates belt gathering and/or "jumping" as the belt travels through the rollers of at least some types of cooking devices.

As shown in FIGS. 2 and 3, the flexible belt wrapper 30 includes two protrusions 46 attached to the flexible substrate 32. Each of the protrusions 46 include an engagement surface 48 adapted to secure the protrusion 46 to a portion of an underlying conveyor belt to drive the belt wrapper at a same speed as the conveyor belt. The engagement surface 48 is disposed facing a direction that is parallel to the second face 34, and is designed to hook or otherwise hold onto a portion of the bottom conveyor belt. As shown in the embodiment of FIGS. 2 and 3, the engagement surface 48 has a curved and/or concave portion that can hook or clip onto a conveyor belt formed of or including a chain, wire, or crossbar. To accomplish a secure connection it is desirable that the engagement surface has a shape and/or curvature that correspondingly matches a curvature of a wire, crossbar, or other portion of the underlying conveyor belt.

In one embodiment of this invention, as shown in FIGS. 2 and 3, the protrusions 46 each include a second engagement surface 48' that faces an opposite direction from the first engagement surface 48. The protrusions 46 each include a base 50 that is fastened or otherwise attached to the flexible substrate, and the two engagement surfaces 48 and 48' extend from opposing side edges of the base 50. The protrusions in FIGS. 2 and 3 are thus embodied as a clip that secures, such as by a snap fitment, to or around two wires, crossbars, or other portions of the underlying conveyor belt.

Figure 4:
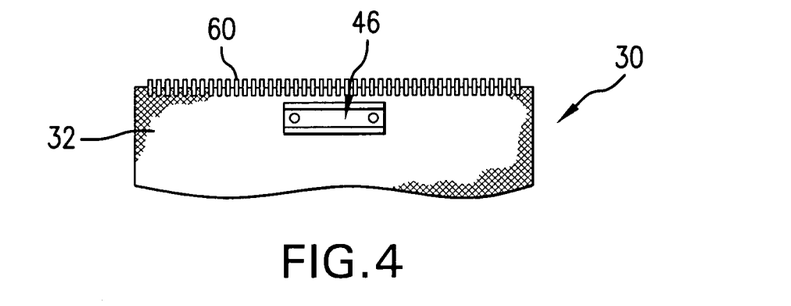
FIGS. 4-10 each illustrate an exemplary alternative embodiment of a protrusion according to this invention.
Figure 5:
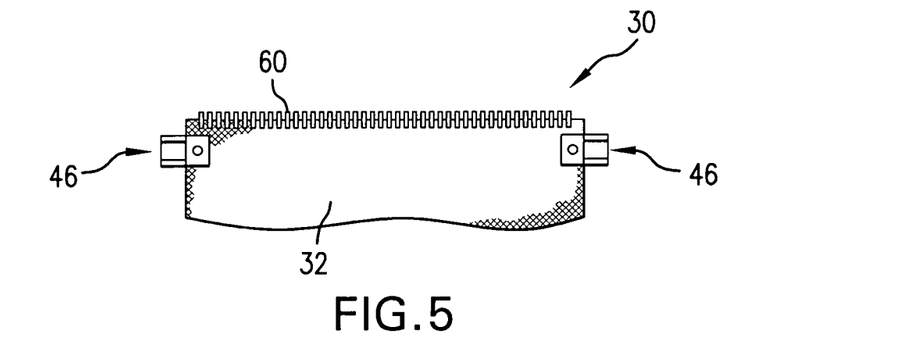
Figure 6:
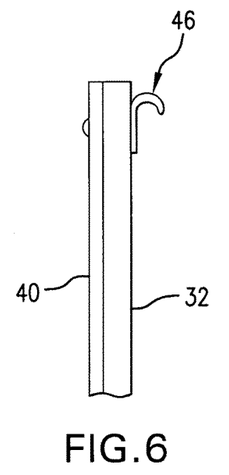
Figure 7:
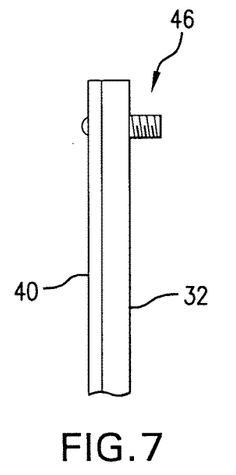
Figure 8:
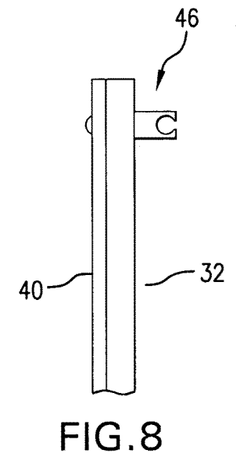
Figure 9:
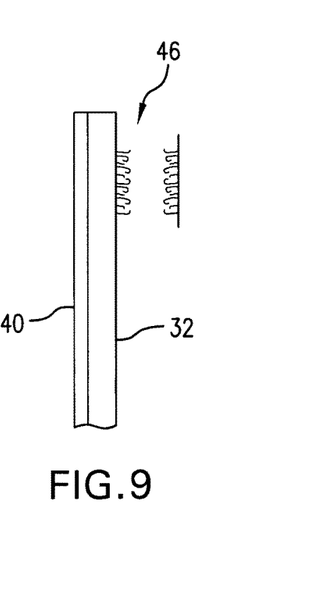
Figure 10:
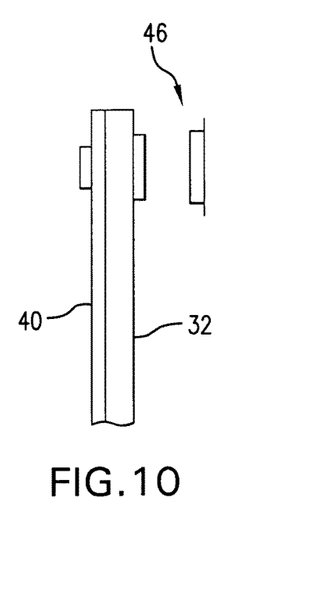

FIGS. 4-10 illustrate, without limitation, various and alternative embodiments of a protrusion according to this invention. FIG. 4 includes a single, longer clip 46 as an alternative to the two smaller, spaced-apart clips shown in FIG. 2. FIG. 5 illustrates an embodiment with two clips 46 that each extends out from a side edge of the belt 30 to clip onto the underlying conveyor belt or another conveyor device element. FIG. 6 illustrates a hook protrusion 46 with a curved or concave surface extending from only one side edge of a base fastened to the flexible substrate. FIG. 7 illustrates a lug 46 that can include threads or other attachment element, such as a cotter pin. FIG. 8 illustrates an exemplary peg 46 that can be hooked or snapped onto wires or bars of a belt. FIG. 9 illustrates a snap protrusion 46 with a male portion on one of the belt wrapper 30 or the underlying belt, and a female portion on the other of the belt wrapper or the underlying belt. FIG. 10 illustrates a hook and loop fastener protrusion 46, which is desirably a stainless steel hook and loop fastener.

The protrusion(s) according to this invention can be formed of various and alternative materials, such as metal or a high-temperature resistant polymer. The protrusions can be molded to/from, adhered to, and/or mechanically fastened to the flexible substrate. As shown in FIG. 2, the protrusions 46 are mechanically fastened by rivet 52 through an opening in base 50. Other mechanical fastener possibilities include screws and bolts.

Figure 11:
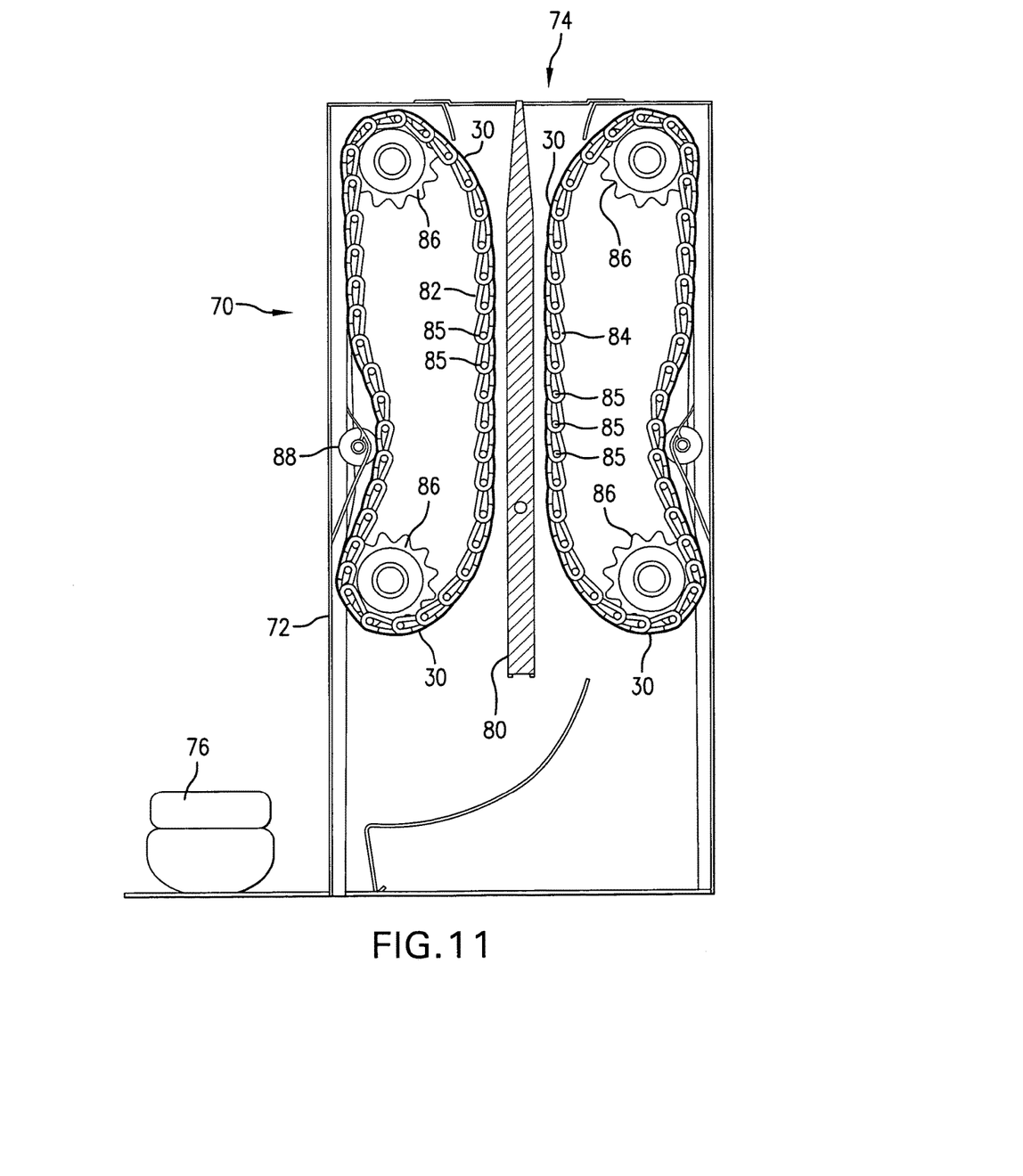
FIG. 11 generally illustrates a belt wrapper in combination with a contact toaster, according to one embodiment of this invention.

FIG. 11 illustrates the belt wrapper 30 in combination with a representatively shown contact toaster device 70. The toaster device 70 includes a housing 72 with an inlet 74 for receiving the bun 76 halves to be toasted. A platen 80 is disposed through the middle of housing 72 and includes resistance heating elements so that its opposing surfaces are heated. To facilitate movement of the bun 76 across platen 80, the platen 80 surfaces should have smooth, non-stick surfaces. Two link conveyor belts 82 and 84, each having cross-wires or bars, are positioned on opposite sides of platen 80. Each conveyor belt 82 and 84 is looped around a pair of sprocket wheels 86. Each of the conveyor belts 82 and 84 is also tensioned by a spring mounted idler roller 88. One of the belt wrapper 30 is secured around each of the conveyor belts 82 and 84 by connecting the two opposing end lacings 60 (which are held secured and/or reinforced over the coating 40 by material strip 62) by a pin, and with the clips 46 clipped onto two adjacent cross-bars 85 of the conveyor belts 82 and 84, respectively. The halves of bun 76 are placed into the toaster 70 and pass along and against platen 80, propelled by conveyor belts 82 or 84 with the overlying belt wrappers 30 moving without slipping at the same speed of the corresponding conveyor belts 82 and 84. Ribs 42 on the belt wrapper 30 assist in moving bun 76 against the platen 80. In one embodiment of this invention, the ribs 42 are discontinuous as shown in FIG. 1, with a spacing 64 between a first plurality of ribs 66 on one side of belt 30 and a second plurality of ribs 68 on an opposing lateral side of belt 30. The spacing is provided, for example, to allow a smooth path for tensioning idle roller 88.

Figure 12:
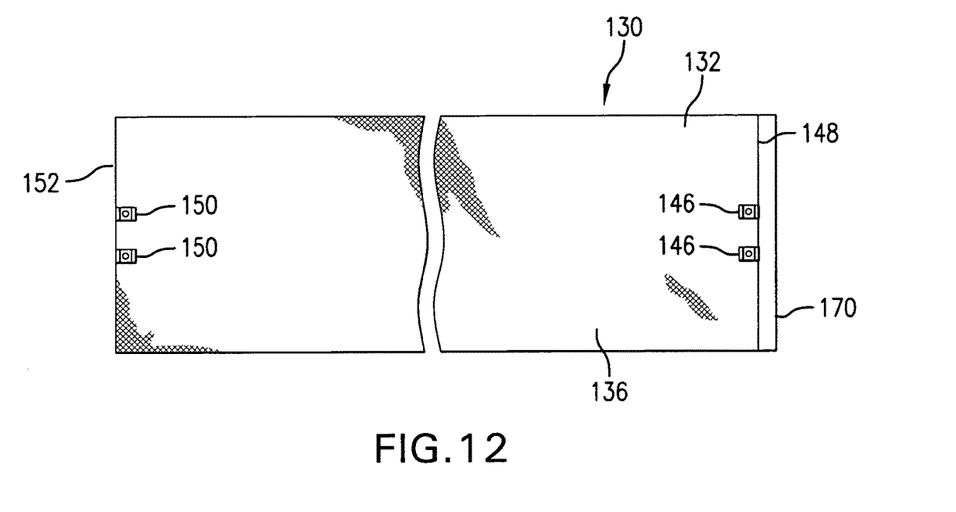
FIG. 12 is a planar view of a belt wrapper according to another embodiment of this invention, having no lacing.
Figure 13:
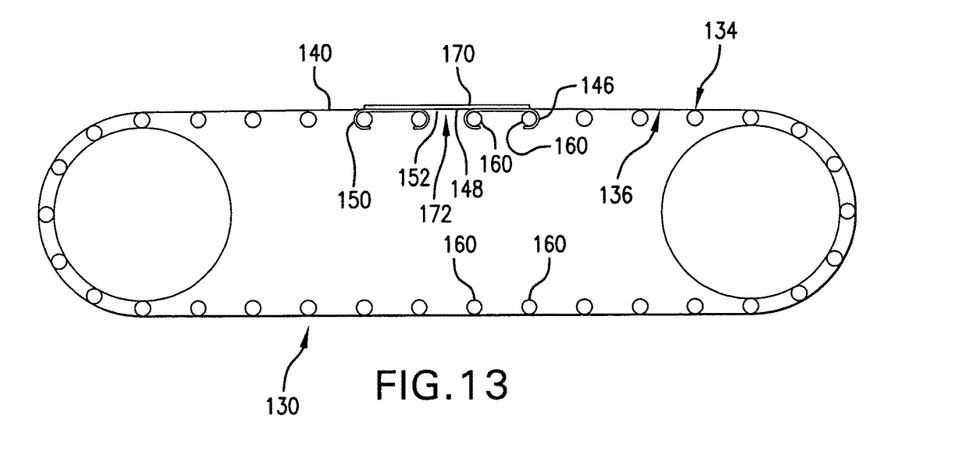
FIG. 13 generally illustrates the connection of the belt wrapper of FIG. 12 to a metal link conveyor belt.
Figure 14:
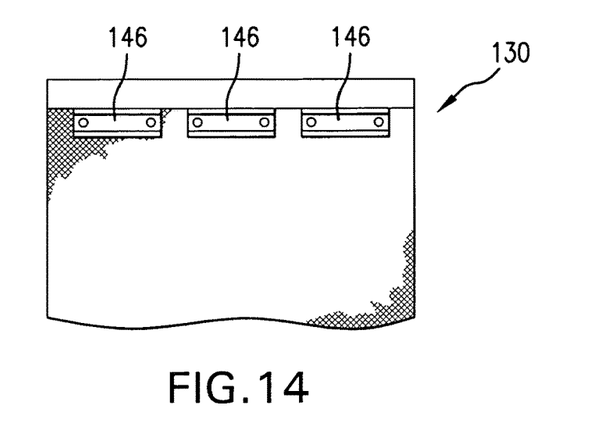
FIG. 14 is exemplary alternative embodiment of a protrusion according to this invention.
Figure 15:
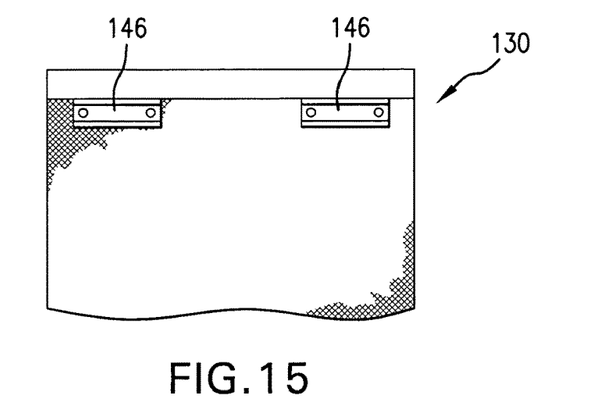
FIG. 15 is exemplary alternative embodiment of a protrusion according to this invention.
Figure 16:
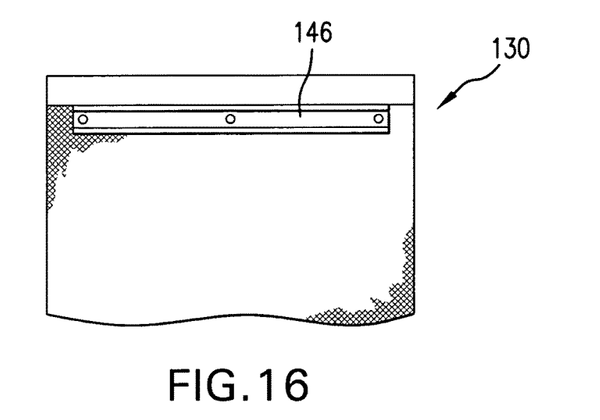
FIG. 16 is exemplary alternative embodiment of a protrusion according to this invention.

FIGS. 12 and 13 illustrate a flexible belt wrapper according to another embodiment of the invention. The flexible belt wrapper 130 includes a flexible substrate 132 having a first face 134 and a second face 136 that is opposite the first face 134. The flexible belt wrapper 130 includes a coating 140, with or without ribs or flights, on the first face 134. The flexible substrate and coating can be formed as discussed above. The flexible belt wrapper 130 includes a first set of protrusions 146 attached to a first end 148 of the flexible substrate 132. The flexible belt wrapper 130 further includes a second set of protrusions 150 attached to a second end 152 of the flexible substrate 132. The protrusions 146 and 150 can be embodied as various and alternative protrusions, such as described above, and are each shown as clips, which as shown in FIG. 13, each including two opposing curved engagement surfaces 154 that clip around two adjacent chains, wires, or crossbars 160 of a representatively shown conveyor belt. Exemplary alternative clips for use as the protrusions 146 and/or 150 include at least 2-4 longer dimensioned clips per belt end, such as shown in FIGS. 14 and 15, or the single clip extending across each belt end as shown in FIG. 16.

As shown in FIG. 13, the protrusions 146 and 150 secure the leading end 148 adjacent to the trailing end 152 of belt 130 without the need for additional lacings, such as shown in FIGS. 1-3. A flap 170 of material is sintered or otherwise attached to the flexible substrate 132 to cover the seam or spacing 172 between the leading edge 148 and trailing edge 152. This embodiment has particular advantage in making the belt wrapper easier and less time-consuming to apply to a conveyor belt. Also, in restaurant settings, the belt wrapper is typically changed by restaurant employees, and inserting the lacing pin can be difficult and, due to metal edges and hot cooking devices, has been known to cause minor injuries.

Thus, the invention provides an improved belt wrapper with an enhanced connection to a metal wire or similar conveyor belt. The protrusions on the belt wrapper secure the belt wrapper and reduce or eliminate belt wrapper slipping on the metal belt, and keep the belt wrapper centered and properly tracking on the metal belt. The belt wrapper of this invention also facilitates easier and safer belt wrapper replacement.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A flexible belt wrapper for a continuous conveyor belt, comprising:
   a flexible substrate having a first face and a second face opposite the first face;
   a coating on the first face of the flexible substrate; and
   a clip attached to the second face of the flexible substrate, the clip including a base with a first end, wherein the first end of the base is curved to form an engagement surface that is curved outward from the flexible substrate and curved back over the base, and that is adapted to secure the clip to a portion of the conveyor belt to drive the belt wrapper at a same speed as the conveyor belt.

2. The flexible belt wrapper according to claim 1, wherein the flexible substrate comprises fiberglass, nylon, polyester polyethylene, aramid, polyimide, polyphenylene sulfide, polyethersulfone, polyetheretherketone (PEET), or combinations thereof, and wherein the coating comprises a fluoroplastic, fluoroelastomer, silicone rubber, urethane rubber, or combinations thereof.

3. The flexible belt wrapper according to claim 1, wherein the engagement surface is disposed facing a direction that is parallel to the second face.

4. The flexible belt wrapper according to claim 1, wherein the engagement surface comprises a curved portion and the conveyor belt comprises a chain, cross-wire, or crossbar to which the curved portion directly connects and extends partially around.

5. The flexible belt wrapper according to claim 1, wherein the engagement surface has a curvature at least as large as a curvature of a cross-wire or crossbar of the conveyor belt.

6. The flexible belt wrapper according to claim 1, wherein the engagement surface is concave.

7. The flexible belt wrapper according to claim 1, wherein the clip is formed of metal or a high-temperature resistant polymer.

8. The flexible belt wrapper according to claim 1, wherein the clip is mechanically fastened to the flexible substrate by a rivet, screw, or bolt extending through both the base and the flexible substrate.

9. The flexible belt wrapper according to claim 1, wherein the base is curved along an entirety of the first end of the base.

10. The flexible belt wrapper according to claim 1, wherein the base has a second end opposite the first end, wherein the second end of the base is curved to form a second engagement surface that is curved outward from the flexible substrate and curved back over the base, and each of the first end and the second end curves inward toward an other of the first end and the second end.

11. The flexible belt wrapper according to claim 1, wherein the flexible belt wrapper includes a leading end and a trailing end, the clip is disposed at the leading end to secure the leading end to the conveyor belt, and further comprising a second clip attached to the flexible substrate at the trailing end to secure the trailing end to the conveyor belt.

12. The flexible belt wrapper according to claim 1, further comprising ribs raised above the coating on the first face.

13. The flexible belt wrapper according to claim 12, wherein each of the ribs is discontinuous across the first face.

14. The flexible belt wrapper according to claim 1, wherein the continuous conveyor belt is a metal link belt in a toasting machine.

15. A flexible belt wrapper for a continuous conveyor belt, the belt wrapper comprising:
   a flexible substrate having a first face and a second face opposite the first face;
   a polymer coating on the first face of the flexible substrate; and
   a clip fastened to the second face of the flexible substrate, the clip comprising a base including opposing side edges each curved outward from the second face and curved inward toward each other to form two oppositely and inwardly facing curved hooks each adapted to directly engage around a corresponding chain, cross-wire, or crossbar of the conveyor belt to attach the belt wrapper to the conveyor belt.

16. The flexible belt wrapper according to claim 15, wherein the clip is attached to the flexible substrate by a rivet, screw, or bolt through the flexible substrate.

17. The flexible belt wrapper according to claim 15, wherein each end of the flexible substrate includes one of two lacings, wherein a first of the two lacings is secured to the second of the two lacings by a pin extending through the two lacings.

18. The flexible belt wrapper according to claim 15, wherein the flexible belt wrapper includes a leading end and a trailing end, the clip is disposed at the leading end to secure the leading end to the conveyor belt, and further comprising a second clip attached to the flexible substrate at the trailing end to secure the trailing end to the conveyor belt.

19. The flexible belt wrapper according to claim 15, further comprising spaced apart polymer ribs raised above the coating on the first face, wherein each of the ribs is discontinuous across the first face.

20. The flexible belt wrapper according to claim 15, in combination with a continuous metal link belt of a cooking device, wherein the belt wrapper overlays the metal link belt and each engagement surface of the clip is hooked partially around one of two parallel metal cross-wires or parallel crossbars of the metal link belt.

21. A flexible belt wrapper for a continuous conveyor belt, the belt wrapper comprising:
   a flexible substrate having a first face and a second face opposite the first face, the flexible substrate comprising polymer coated fiberglass;
   a silicone coating on the first face of the flexible substrate; and
   a metal clip fastened to the second face of the flexible substrate by a rivet, screw, or bolt through the flexible substrate, the clip comprising a base including opposing side edges each curved outward from the second face and each curved inward back toward each other to form two opposing curved engagement surfaces each adapted to engage partially around a corresponding chain, cross-wire, or crossbar of the conveyor belt to drive the belt wrapper at a same speed as the conveyor belt.

22. The flexible belt wrapper according to claim 21, further comprising silicone ribs extending from the silicone coating on the first face, each of a first plurality of the ribs laterally aligned with and separated by a spacing from one of a second plurality of the ribs.

23. The flexible belt wrapper according to claim 21, wherein the flexible belt wrapper includes a leading end and a trailing end, the clip is disposed at the leading end to secure the leading end to the conveyor belt, and further comprising a second clip attached to the flexible substrate at the trailing end to secure the trailing end to the conveyor belt.

24. The flexible belt wrapper according to claim 21, wherein each of the engagement surfaces comprises a concave hook curved back over the base and the concave hook extending continuously along a corresponding one of the opposing side edges from a first edge of a base.

25. The flexible belt wrapper according to claim 21, wherein each of the opposing side edges is curved back over the base toward an other of the opposing side edges.

26. The flexible belt wrapper according to claim 21, further comprising the belt wrapper in combination with a contact toaster device, the contact toaster device including a housing, a heated platen disposed within the housing, and two link conveyor belts, each on one of opposing sides of the platen, each of the two link conveyor belts including a plurality of spaced apart parallel cross bars, wherein the flexible belt wrapper is wrapped over a first of the two link conveyor belts and between the first of the two link conveyor belts and the platen, and each of the opposing side edges of the clip is curved around a corresponding one of the cross bars of the first of the two link conveyor belts.

* * * * *